United States Patent [19]

Pittman et al.

[11] Patent Number: 4,911,788

[45] Date of Patent: Mar. 27, 1990

[54] METHOD OF WET-FORMING MINERAL FIBERBOARD WITH FORMATION OF FIBER NODULES

[75] Inventors: William D. Pittman, Ruskin; Alan L. Boyd, Largo; Fred L. Migliorini, St. Petersburg, all of Fla.

[73] Assignee: The Celotex Corporation, Tampa, Fla.

[21] Appl. No.: 210,446

[22] Filed: Jun. 23, 1988

[51] Int. Cl.$^4$ .............................................. D21H 5/18
[52] U.S. Cl. ..................... 162/145; 162/175; 162/181.8.188; 162/194; 162/204; 162/216
[58] Field of Search ............... 162/152, 194, 204, 221, 162/222, 223, 145, 181.8, 216, 175, 135, 188

[56] References Cited

U.S. PATENT DOCUMENTS

| | | | |
|---|---|---|---|
| 2,077,720 | 4/1937 | Seigle et al. | 92/21 |
| 2,702,241 | 2/1955 | Hawley et al. | 92/3 |
| 2,732,295 | 1/1956 | Hollenberg, Jr. | 92/21 |
| 2,773,764 | 12/1956 | Park | 92/3 |
| 3,013,937 | 12/1961 | Brown et al. | 162/194 |
| 3,093,533 | 6/1963 | Hella et al. | 162/145 |
| 3,250,633 | 5/1966 | Cotts | 106/214 |
| 3,379,608 | 4/1968 | Roberts et al. | 162/145 |
| 3,804,706 | 4/1974 | Kurashige et al. | 162/109 |
| 4,024,014 | 5/1977 | Akerson | 162/145 |
| 4,072,558 | 2/1978 | Akerson | 162/145 |
| 4,153,503 | 5/1979 | Booth et al. | 162/123 |
| 4,263,093 | 4/1981 | Shenk | 162/222 |
| 4,698,257 | 10/1987 | Goll | 156/219 |

*Primary Examiner*—Peter Chin
*Attorney, Agent, or Firm*—James W. Grace; Charles W. Vanecek

[57] ABSTRACT

A method of producing an acoustical mineral fiberboard comprising
  (a) forming an aqueous slurry of mineral fiber-containing solids suitable for forming an acoustical board, the solids content of the slurry being sufficiently high to bring about predominant formation of nodules of mineral fiber throughout the slurry upon mixing of the slurry;
  (b) mixing the slurry to form the nodules of mineral fibers;
  (c) dewatering the slurry to form a wet felt;
  (d) drying the wet felt; and
  (e) texturing one surface of the dried felt without mechanically punching holes in the surface.

30 Claims, 1 Drawing Sheet

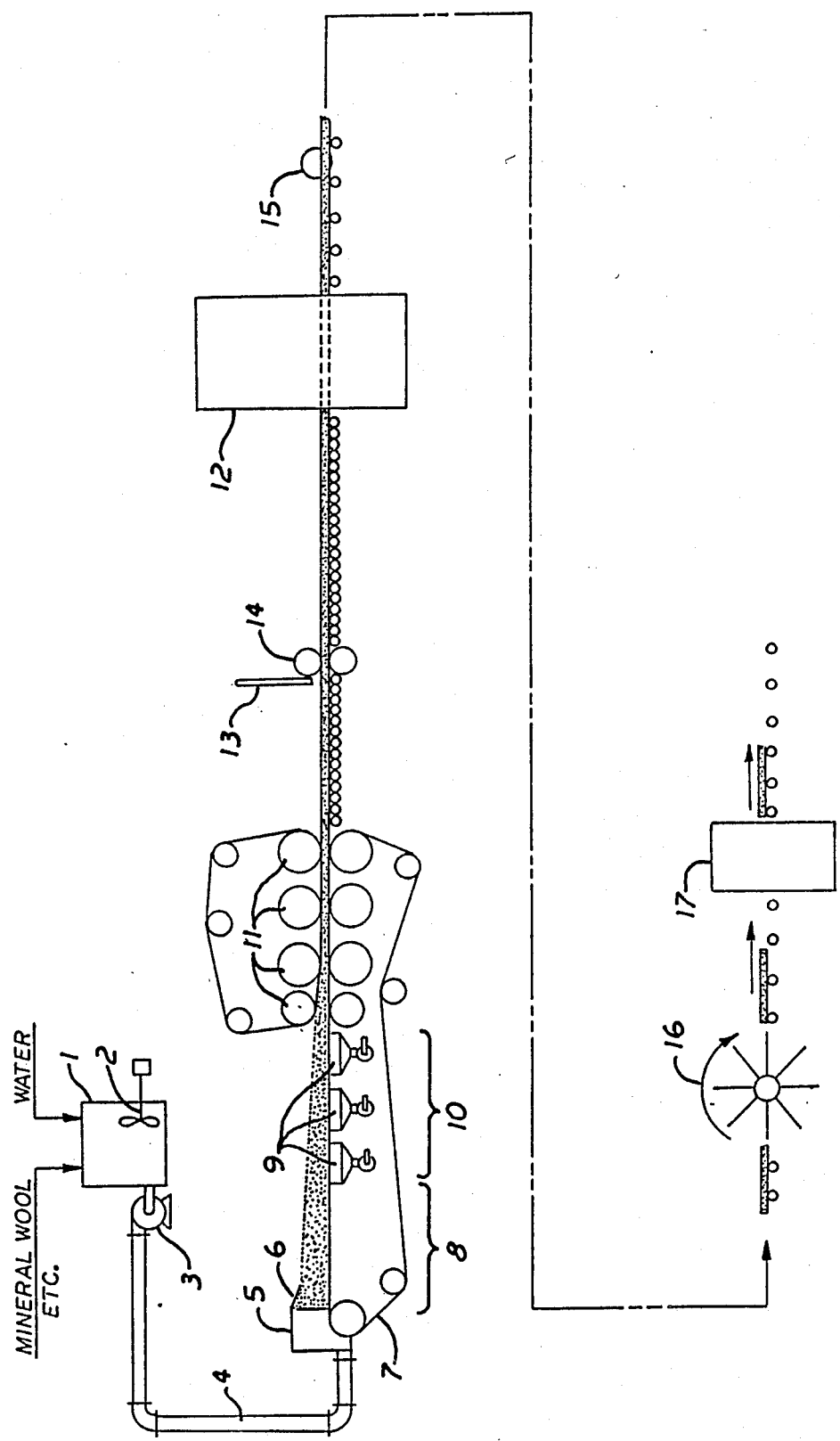

METHOD OF WET-FORMING MINERAL FIBERBOARD WITH FORMATION OF FIBER NODULES

BACKGROUND OF THE INVENTION

1. Field of the Invention

This invention relates to a wet process of manufacturing mineral-fiberboard products, and is concerned more particularly with the production of a mineral fiber acoustical board having a fine-textured appearance.

2. Description of the Prior Art

Acoustical boards which have high sound-absorption properties can be made from a water slurry of mineral wool fibers and a binder such as starch. In the manufacture of a desirable type of such boards, the mineral wool is introduced to the slurry in the form of pellets of nodulated mineral wool. A mat is then formed by continuously depositing the slurry upon a moving wire screen and removing the water by drainage and suction. The mat thus formed is dried and the binder set, after which the mat is cut into units of desired dimensions. The product may be provided with fissures or perforations or otherwise textured in order to improve its appearance and enhance its sound-absorption properties. Use of the nodulated mineral wool contributes to an especially attractive appearance in the finished product and also improves the porosity of the product, enabling it to absorb sound more readily.

A disadvantage of the above water-laid technique is that it requires the pre-nodulation of the mineral wool and thus entails an additional process step. Also, various conventional methods of nodulating or granulating mineral wool unfortunately result in breakage of fibers, which diminishes the quality of the wool.

It would be desirable to provide a mineral fiberboard product which would have a combination of advantageous physical properties, including a highly decorative and pleasing appearance, by a wet-forming technique which would be relatively simple and economical and not require extra manufacturing steps, such as a pre-nodulation of mineral fibers.

OBJECTS OF THE INVENTION

It is therefore an object of the present invention to provide an improved method of producing a wet felted board containing mineral fibers, whereby the fibers are nodulated during mixing of the board-forming ingredients instead of prior thereto.

It is another object of the present invention to provide a wet felted, fine-textured mineral fiberboard which is characterized by a combination of desirable physical properties, including good strength and sound-absorption properties and a highly decorative surface.

Other objects and advantages of the present invention will become apparent to those skilled in the art when the instant disclosure is read in conjunction with the accompanying drawing.

SUMMARY OF THE INVENTION

The above objects have been achieved in the method of the present invention, wherein a water felted board is produced from a slurry containing mineral fibers which are nodulated during wet mixing of the slurry's ingredients. Applicants have found that extensive mineral fiber nodulation can be brought about by utilizing a slurry having a suitably high consistency. It is preferred that the consistency of the slurry be greater than 6%, more preferably greater than 7%.

The mineral fiberboard-forming slurry is formed by mixing a composition comprising, based on the total weight of dry ingredients, from about 40 to 80 percent by weight of mineral fiber, 2 to 20 percent by weight of cellulosic fiber, 0 to 40 percent by weight of perlite, 0 to 30 percent by weight of clay, and 1 to 20 percent by weight of binder. These ingredients are combined with sufficient water to make up a slurry having a total solids of from about 4 to 10 percent by weight.

The ingredients, together with the water necessary to make up the required high slurry consistency, are added to conventional mixing and holding equipment from which they are flowed onto the board-forming wire of a machine such as a Fourdrinier through a conventional head box. The water-laid mat which is thus formed is compressed and dried. The resulting dried board surface is then modified to yield a finished product having a combination of desirable properties, including a visually appealing surface. The surface modification may include abrasion, such as by surface brushing or surface blasting (e.g., by a centrifugal force blasting machine), or any other treatment which results in a decorative appearance.

DESCRIPTION OF THE DRAWING

The invention will now be described with reference to the accompanying drawing which is a diagrammatic, side elevational view of an apparatus for carrying out the method of the present invention.

DETAILED DESCRIPTION OF THE INVENTION

The process of the present invention is carried out by forming an aqueous suspension of the material to be nodulated, such as mineral wool or glass wool, and the other board-forming ingredients. In a typical preparation of a slurry in accordance with the invention, conventionally felted mineral wool is first added to a machine chest 1 containing water. Then the other ingredients, typically consisting of aqueous suspensions of perlite and optionally clay, of starch, and of paper, are added to the machine chest. The machine chest agitator 2 is suitably operated to keep the slurry stirred up so that the ingredients, including the formed nodules of mineral wool, are uniformly distributed throughout the slurry. The rate and duration of agitation for forming an appropriate content of nodulated wool in the slurry can be readily determined through routine experimentation. Generally, the slurry is mixed for about 10 to 60 minutes by means of a rotary agitator (impeller) revolving at a rate of about 100 to 150 revolutions per minute.

The consistency or solids content of the board-forming slurry must be sufficiently high to bring about substantial formation of nodulated wool upon mixing of the slurry. When the dried board containing this nodulated mineral wool is subjected to surface modification, e.g., by sandblasting equipment, centrifugal force blasting equipment, brushes, coaters, or the like, a pleasing appearance is created on the board's surface. The content of nodulated wool and the surface modification technique coact to produce the decorative surface on the fiberboard products of the invention.

The mineral wool-containing slurry can have a very wide range of consistencies, from relatively thick to almost unstirrable. The extremely thick slurries are less desirable because of the difficulty in processing them.

The consistency is advantageously greater than about 5, more preferably 6, and most preferably 7 wt % solids. The aqueous fibrous slurry generally will have a consistency in the range from about 4 to 10, preferably 6 to 8, and more preferably 6.5 to 7.5, wt % solids. This use of high consistencies in accordance with the present invention is contrary to the conventional practice of keeping the solids content of the slurry as low as possible, such as between about 2-4 wt %, so as to provide long and stringy fibers for optimum wet felting.

The mineral fiber component to be nodulated in accordance with the invention includes wool or fibers formed from rock, slag, fused glass, glass mixtures thereof and other heat liquefiable raw materials capable of being converted into fibers. The mineral fibers usually have a ratio of length to diameter which is equal to 10 or higher, with lengths which vary between 0.1 and 100 mm, more typically between 1 and 10 mm, and diameters within the range of 0.1 to 25 microns. The mineral wool employed in the process of the invention typically has fiber diameters from about 4 to 8 microns, an acid/base ratio (molar) of about 0.80 to 1.10 and the following composition:

| Mineral Wool Composition | | |
|---|---|---|
| | Typical (%) | Range (%) |
| $SiO_2$ | 45 | 42–48 |
| $Al_2O_3$ | 8 | 7–9 |
| CaO | 37 | 36–38 |
| MgO | 7 | 6–9 |

The slurry also may contain cellulosic fibers and a binder. The solids of the slurry may comprise about 20% to 85% mineral fibers and about 2% to 15%, preferably 2% to 10%, cellulosic fibers, and the binding agent in an amount sufficient to form the board of the invention, as, e.g., about 5% to 15%.

The cellulosic fibers may be wood fibers, primary or secondary paper fibers, cotton linters or the like. The fiber length will generally be up to about ¼ inch in length. Highly desirable fibers for use in the present invention are newsprint fibers which will generally have a length of from about ¼ millimeter to about 5 millimeters with an average length of about 1 millimeter.

Numerous materials may be used as binding agents in the board-forming composition of the invention. Useful binders include starch, chemically modified starches, phenol-formaldehyde or other artificial resin binders, sodium silicate, glue, casein, rubber latex, aqueous rubber dispersions or emulsions, asphalt emulsions, or combinations thereof. The binder may include a minor amount of virgin kraft pulp, as disclosed in U.S. Pat. No. 2,773,764.

A wide variety of fillers can be employed in the mineral fiber containing composition of the invention. The preferred fillers are those which are inorganic. The filler or fillers generally constitute about 5 to 70, more preferably about 15 to 50, most preferably about 15 to 40 weight percent (dry solids basis) of the composition. Examples of suitable fillers include calcium carbonate, plaster and gypsum, silica, sericite, expanded perlite, fly ash, vermiculite, natural clay, such as kaolin, bentonite or ball clay, talc, mica and other silicates.

Advantageously, the composition contains about 5 to 50, preferably 5 to 40, and more preferably 10 to 35, wt % (dry solids basis) of expanded perlite particles, which suitably have a density in the range from about 3.0 to 8.0, preferably 5.0–8.0, pcf. The expanded perlite used in the present invention has a typical screen analysis as follows:

Expanded Perlite Typical Sieve Analysis

| | % Retained | |
|---|---|---|
| U.S. Sieve No. | Typical | Range |
| 8 | 0 | 0 |
| 16 | 0 | 0–2 |
| 30 | 8 | 4–20 |
| 50 | 55 | 35–60 |
| 100 | 27 | 15–40 |
| pan | 10 | 10–20 |

The slurry additionally may contain other auxiliary substances useful in conventional mineral fiberboard-forming compositions, such as preservatives, wetting agents, defoamers, retention aids, sizing agents, and broke. The amounts of such auxiliary additives can be readily determined by those skilled in the art.

A typical formulation (dry weight basis) for formation of the textured board of the present invention is as follows:

| Ingredient | Typical (%) | Range (%) | Preferred Range (%) |
|---|---|---|---|
| Mineral Wool | 65 | 40–80 | 60–70 |
| Clay | 0 | 0–30 | 0–5 |
| Perlite | 22 | 0–40 | 20–30 |
| Cellulosic Fibers | 4 | 2–20 | 3–9 |
| Starch | 9 | 5–20 | 7–12 |
| Retention Aid | 0.03 | 0–1 | 0–0.1 |

After the mineral wool containing slurry is agitated sufficiently to nodulate the wool, the slurried composition is delivered by pump 3 through pipe 4 to head box 5. The slurry is subsequently deposited on Fourdrinier wire 7 through orifice 6 of head box 5. The first section 8 of the Fourdrinier wire permits free drainage of water from the material and further drainage is promoted by suction boxes 9 in section 10. As the slurry is brought in contact with the Fourdrinier machine and water of the slurry drains through the wire screen, a wet felted mat of the mineral fiber composition forms on the machine. The wet laid mat is dewatered by the Fourdrinier machine to a solids content of about 20 to 40 weight percent.

The partially dried material is then prepressed to a thickness of about 0.4 to 0.8 inch by a plurality of press rolls 11. It will be appreciated that a single set of press rolls could be employed if desired. After being pressed, the sheet product will generally have from about 60 to about 75% water. A coating may be applied to the pressed mat by means of feed-pipe 13 and coater 14.

After passing through press rolls 11, the wet mat is transferred into dryer 12. At the outlet of the dryer, there is obtained a board having a moisture content of less than about 1.0%. The board is cut into smaller panels by saw arrangement 15. The dried product can be subjected to any suitable conventional finishing apparatus, depending on the applications for which it is intended. Such apparatuses may include applicators for applying coatings to protect and/or decorate the product surface, such as bevel coaters, finish spray coaters, printers, multi-color decorative coaters, and the like, and further drying equipment.

A fine-textured appearance can be created on one of the two major surfaces of the dried board by any suitable texturing means 17, such as by abrading, scoring, brushing, etc. The board may be advantageously turned over by an inverter 16 to present the smooth screen side for surface treatment. It has been found that a wheel blaster, such as that supplied by Wheelabrator-Frye, Inc. and known as a Tile Etch Machine, produces a surface which is fine-textured and visually appealing.

The wheel blaster uses centrifugal force to propel abrasive material against the board surface. Suitable abrasive material for eroding the surface includes metal grit, plastic abrasive, and walnut shells. Typically, the surface abrasion removes only about 0.01–0.04 inch of the board surface in producing the desired look. The finish coat is suitably applied to the board surface after its treatment by the blasting machine.

In accordance with the process of the present invention, the mineral fiber-containing slurry is typically formed into a textured fiberboard of from about 0.4 to 0.8 inch thick, preferably from about 0.5 to 0.8 inch thick, and having a density of from about 10 to 25 pounds per cubic foot, preferably from about 10 to 20 pounds per cubic foot. The noise reduction coefficient (NRC) of the board is generally from about 0.50–0.70, and preferably greater than 0.55, and can be secured without the use of mechanical punching or fissuring, although, if desired, the latter means of perforating the board surface can be employed to further enhance the NRC.

The present invention provides a unique method of producing from a mineral wool-containing slurry a wet-felted mineral ceiling product with a subtly-textured surface appearance. The board-forming slurry is formulated to contain a high consistency (solids content), such as from about 6.0–7.5 wt %, and advantageously to contain a relatively high mineral wool content (e.g., >55 wt %, dry solids basis) and low cellulosic fiber content. Wet mixing of this slurry to homogenize it results in nodulation or balling-up of the mineral wool. After the nodulated wool-containing slurry is formed into a wet mat and dried, the surface of the dried board can then be modified, such as by wheel blasting or brushing, to produce a fine-textured fibrous product which is eminently suitable for use as an acoustical tile or panel for ceiling and wall decoration. The product has the desired appearance and good acoustical value for such purposes without the conventional pin punched perforations normally provided in acoustical ceiling board. The process of the invention is an improvement over the prior practice of using pre-nodulated wool in fiberboard formation by eliminating the need for such pre-nodulation. By providing an "hydraulic cushion" during nodulation, the present process has the further advantage of doing less mechanical damage to the wool fibers than the pre-nodulating technique.

The present invention is further illustrated by the following examples in which all percentages are by weight.

EXAMPLE 1

This example illustrates with reference to the drawing the large-scale production in accordance with the present invention of a wet-felted ceiling product.

The formulation utilized in manufacturing the product consisted of the following ingredients in the listed percentages by weight:

| Ingredient | % |
| --- | --- |
| Mineral Wool | 54.3 |
| Clay | 17.0 |
| Perlite | 15.0 |
| Newsprint | 6.5 |
| Starch | 7.2 |
| Retention Aid | 0.05 |

The ingredients were diluted with water to form a slurry in machine chest 1. Wet mixing of the slurry, which had a stock consistency of 5.5 wt %, nodulated the mineral wool. The slurry was transferred to head box 5 and next deposited on Fourdrinier wire 7. The slurry was dewatered in a conventional manner on the Fourdrinier machine to form a wet felt or mat of interlocked fibers. The partially dewatered fibrous mat was next passed through a press section comprising pressing rolls 11, which densified the mat and provided a wet mat of uniform thickness (about one inch) with a moisture content of about 65%. After leaving the press section, the wet mat was conveyed to dryer 12.

After being dried, the board product was subjected to various conventional finishing steps, which included cutting into appropriate sizes and cleaning. After being flipped over by inverter 16, the board product was then abraded on the screen side by a wheel blaster, and this side was coated to produce textured fiberboards of the invention.

Mineral ceiling panels made in accordance with the foregoing procedure had the following physical properties:

| | |
| --- | --- |
| Average Thickness, in | 0.78–0.79 |
| Average Density, lb/cu ft | 17.4–18.2 |
| Transverse Strength, lb | 42–60 |
| NRC | 0.50 |

EXAMPLE 2

Another wet-felted ceiling product was manufactured, utilizing the following ingredients in the listed percentages by weight:

| Ingredient | % |
| --- | --- |
| Mineral Wool | 67.0 |
| Perlite | 22.7 |
| Newsprint | 8.4 |
| Starch | 7.3 |
| Retention Aid | 0.05 |

A slurry of the ingredients having a consistency of 5.5 wt % was formed and mixed to nodulate the mineral wool. The slurry was converted to textured fiberboards in accordance with the procedure described in Example 1. The process was repeated except that feed-pipe 13 and coater 14 were employed to coat the mat and thus provide, after the coated mat was turned upside down by inverter 16, a backsizing on the finished fiberboards.

Backsized and unbacksized mineral ceiling panels made in accordance with the foregoing procedures had the physical characteristics reported in the following Table:

TABLE

Evaluation of Fiberboards

| Physical Property | Value |
| --- | --- |
| ASTM E-84 Tunnel Test Rating | Class I with a 20 Flame Spread and 10 smoke Developed |
| Average Thickness in | 0.739 |
| Average Density, lb/cu ft | 13.3 |
| Transverse Strength, backsized, lb | 26.9 |
| Transverse Strength, unbacksized, lb | 19.0 |
| NRC | |
| 2' X 2' backsized | 50 |
| 2' X 2' unbacksized | 50 |
| 2' X 4' backsized | 55 |
| 2' X 4' unbacksized | 50 |

We claim:

1. A method of producing an acoustical, mineral fiberboard comprising
   (a) forming an aqueous slurry of a mineral fiber-containing composition suitable for forming an acoustical board, the solids content of the slurry being sufficiently high to bring about substantial formation of nodulated mineral fiber upon mixing of the slurry, and the slurry being formulated to contain a high mineral fiber content and low cellulosic fiber content;
   (b) mixing the slurry to uniformly distribute the solids, the rate and duration of mixing being sufficient to form the nodules of mineral fiber;
   (c) dewatering the slurry to form a wet felt;
   (d) optionally coating the wet felt;
   (e) drying the wet felt; and
   (f) abrading the surface of the dried felt to form a fine-textured mineral fiberboard, the fiberboard containing mineral fibers in an amount of from 40–80 percent and cellulosic fibers in an amount of 3–9 percent, with the proviso that, if clay is included as a filler in the fiberboard, the clay is present in an amount in the range from 0–30 percent such that the noise reduction coefficient of the fiberboard is at least about 0.50.

2. The method of claim 1 wherein the solids content of the slurry of step (a) comprises about 40 to 80 weight percent of mineral fibers, 3 to 9 weight percent of cellulosic fibers, and 5 to 15 weight percent of binder.

3. The method of claim 1 wherein the solids content of the slurry of step (a) comprises about 40 to 80 weight percent of mineral wool, 0 to 30 weight percent of clay, 0 to 40 weight percent of perlite, 3 to 9 weight percent of cellulosic fiber, and 5 to 20 weight percent of starch.

4. The method of claim 1 wherein the solids content of the slurry of step (a) is greater than about 5 percent by weight.

5. The method of claim 4 wherein the solids content of the slurry of step (a) comprises about 60 to 70 weight percent of mineral wool, 0 to 5 weight percent of clay, 20 to 30 weight percent of perlite, 3 to 9 weight percent of cellulosic fiber, and 7 to 12 weight percent of starch.

6. The method of claim 4 wherein the surface is abraded by a wheel blaster which uses centrifugal force to propel abrasive material against the surface.

7. The method of claim 6 wherein the abrasive material is walnut shells.

8. The method of claim 1 wherein the solids content of the slurry of step (a) is greater than about 6 percent by weight.

9. The method of claim 8 wherein the solids content of the slurry of step (a) comprises about 60 to 70 weight percent of mineral wool, 0 to 5 weight percent of clay, 20 to 30 weight percent of perlite, 3 to 9 weight percent of cellulosic fiber, and 7 to 12 weight percent of starch.

10. The method of claim 8 wherein the surface is abraded by a wheel blaster which uses centrifugal force to propel abrasive material against the surface.

11. The method of claim 10 wherein the abrasive material is walnut shells.

12. A method of producing an acoustical mineral fiberboard comprising
    (a) forming an aqueous slurry of a mineral fiber-containing composition suitable for forming an acoustical board, the solids content of the slurry being sufficiently high to bring about substantial formation of nodulated mineral fiber upon mixing of the slurry, and the slurry being formulated to contain a high mineral fiber content and low cellulosic fiber content;
    (b) mixing the slurry to uniformly distribute the solids, the rate and duration of mixing being sufficient to form the nodules of mineral fiber;
    (c) depositing the slurry on a moving wire screen to form a partially dewatered wet felt;
    (d) compressing the partially dewatered wet felt to further remove water therefrom;
    (e) optionally coating the felt surface which did not contact the wire screen during dewatering;
    (f) drying the wet felt; and
    (g) forming a decorative pattern on the dried felt by abrading the surface which contacted the wire screen during dewatering to form a fine-textured mineral fiberboard, the fiberboard containing mineral fibers in an amount of from 40–80 percent and cellulosic fibers in an amount of 3–9 percent, with the proviso that, if clay is included as a filler in the fiberboard, the clay is present in an amount in the range from 0–30 percent such that the noise reduction coefficient of the fiberboard is at least about 0.50.

13. The method of claim 12 wherein the solids content of the slurry of step (a) is greater than about 5 percent by weight.

14. The method of claim 12 wherein the solids content of the slurry of step (a) comprises about 40 to 80 weight percent of mineral fibers, 3 to 9 weight percent of cellulosic fibers, and 5 to 15 weight percent of binder.

15. The method of claim 12 wherein the solids content of the slurry of step (a) comprises about 40 to 80 weight percent of mineral wool, 0 to 30 weight percent of clay, 0 to 40 weight percent of perlite, 3 to 9 weight percent of cellulosic fiber, and 5 to 20 weight percent of starch.

16. The method of claim 15 wherein the solids content of the slurry of step (a) is greater than about 5 percent by weight.

17. The method of claim 16 wherein the solids content of the slurry of step (a) comprises about 60 to 70 weight percent of mineral wool, 0 to 5 weight percent of clay, 20 to 30 weight percent of perlite, 3 to 9 weight percent of cellulosic fiber, and 7 to 12 weight percent of starch.

18. The method of claim 16 wherein the surface is abraded by a wheel blaster which uses centrifugal force to propel abrasive material against the surface.

19. The method of claim 18 wherein the abrasive material is walnut shells.

20. The method of claim 19 wherein the solids content of the slurry of step (a) is greater than about 6 percent by weight.

21. An acoustical, mineral fiberboard comprising nodulated mineral fibers, mineral filler, cellulosic fibers and a binder, the fiberboard being produced by the method of claim 1 comprising
   (a) forming an aqueous slurry of a mineral fiber-containing composition suitable for forming an acoustical board, the solids content of the slurry being sufficiently high to bring about substantial formation of nodulated mineral fiber upon mixing of the slurry, and the slurry being formulated to contain a high mineral fiber content and low cellulosic fiber content, mineral filler and a binder;
   (b) mixing the slurry to uniformly distribute the solids, the rate and duration of mixing being sufficient to form the nodules of mineral fiber;
   (c) dewatering the slurry to form a wet felt;
   (d) optionally coating the wet felt;
   (e) drying the wet felt; and
   (f) abrading the surface of the dried felt to form a fine-textured mineral fiberboard, the fiberboard containing mineral fibers in an amount of from 40-80 percent and cellulosic fibers in an amount of 3-9 percent, with the proviso that, if clay is included as a filler in the fiberboard, the clay is present in an amount in the range from 0-30 percent such that the noise reduction coefficient of the fiberboard is at least about 0.50.

22. The method of claim 1 wherein the abraded surface is mechanically punched or fissured to further enhance the noise reduction coefficient.

23. The method of claim 1 wherein the abraded surface is mechanically fissured to further enhance the noise reduction coefficient.

24. The method of claim 23 wherein the abraded surface is additionally mechanically punched to further enhance the noise reduction coefficient.

25. The method of claim 5 wherein the abraded surface is mechanically punched or fissured to further enhance the noise reduction coefficient.

26. The method of claim 12 wherein the abraded surface is mechanically punched or fissured to further enhance the noise reduction coefficient.

27. The method of claim 12 wherein the abraded surface is mechanically fissured to further enhance the noise reduction coefficient.

28. The method of claim 27 wherein the abraded surface is additionally mechanically punched to further enhance the noise reduction coefficient.

29. The method of claim 17 wherein the abraded surface is mechanically punched or fissured to further enhance the noise reduction coefficient.

30. The fiberboard of claim 21 wherein the abraded surface is mechanically punched or fissured to further enhance the noise reduction coefficient.

* * * * *